United States Patent [19]
Park et al.

[11] Patent Number: 5,835,490
[45] Date of Patent: Nov. 10, 1998

[54] OVERLOAD CONTROL METHOD USING CALL CONTROL PROCESS LOAD RATIO OF CDMA MOBILE SYSTEM

[75] Inventors: Woo-Goo Park; Sook-Jin Lee, both of Daejeon; Jee-Hwan Ahn, Chungchungnam-Do; Hun Lee, Daejeon, all of Rep. of Korea

[73] Assignee: Electronics and Telecommunications Research Institute, Daejeon, Rep. of Korea

[21] Appl. No.: 700,869

[22] Filed: Aug. 21, 1996

[30] Foreign Application Priority Data

Aug. 21, 1995 [KR] Rep. of Korea ............... 95-25695

[51] Int. Cl.$^6$ .................................................. H04J 13/00
[52] U.S. Cl. ........................................... 370/342; 370/234
[58] Field of Search ................................. 370/229, 230, 370/231, 232, 233, 234, 235, 237, 238, 335, 346, 320, 342, 464, 351; 375/200, 205; 455/38.1; 379/111, 112, 229, 230, 232, 243

[56] References Cited

U.S. PATENT DOCUMENTS 5,539,729  7/1996  Bodnar ................................. 370/232

*Primary Examiner*—Dang Ton
*Attorney, Agent, or Firm*—Nixon & Vanderhye, P.C.

[57] ABSTRACT

An improved overload control method using a call control process load ratio of a CDMA mobile system which is capable of which is capable of controlling a paging, a signal transmission, and an overload by a signal transmission and receiving by their threshold values by computing an average load ratio of a process and a variable permission ratio at the time of overload using the current CPU occupying ratio and a load ratio of a call control process, which includes the steps of a first step for judging as to whether an overload is loaded by calling an overload judgement procedure when a timer of an overload control process is driven in accordance with a generation of a periodical process of an operating system; a second step for controlling an overload by calling the overload control procedure when it is judged as an overload as a result of the first step; and a third step for releasing the overload state by calling an overload release procedure when the previous state is an overload state by checking the previous state when it is judged that it is not an overload state as a result of the call in the first step.

9 Claims, 12 Drawing Sheets

| CPU OCCUPYING RATIO | BASIC PERMISSION RATIO(%) |
|---|---|
| 100−5*1 | 100−0*J |
| 100−4*1 | 100−1*J |
| 100−3*1 | 100−2*J |
| 100−2*1 | 100−3*J |
| 100−1*1 | 100−4*J |
| 100−0*1 | 100−5*J |

I CPU OCCUPYING RATIO INTERVAL(10)
J BASIC PERMISSION RATIO INTERVAL(20)

FIG. 6

| CONTROL GRADE | CALL CONTROL THRESHOLD VALUE | BASE SYSTEM MANAGEMENT THRESHOLD VALUE |
|---|---|---|
| Minor | 50<=Oc<65 | 50 |
| Major | 65<=Oc<85 | 80 |
| Critical | 85<=Oc<=100 | 100 |

OVERLOAD CONTROL METHOD USING CALL CONTROL PROCESS LOAD RATIO OF CDMA MOBILE SYSTEM

BACKGROUND OF THE INVENTION

1. Field of the Invention

The present invention relates to an overload control method using a call control process load ratio of a CDMA mobile system(CMS), and in particular to an improved overload control method using a call control process load ratio of a CDMA mobile system(CMS) which is capable of controlling a paging and a signal transmission by a threshold value and an overload by a receiving signal by computing an average load ratio of a process and a variable permission ratio at the time of overload using the current CPU occupying ratio and a load ratio of a call control process.

2. Description of the Conventional Art

Conventionally, the CMS is a mobile communication system based on a stored program control (SPC) method such as an electronic switch and is formed with a plurality of processors which are distributed and are formed in a hierarchical structure. These processors perform a predetermined call control process and a non-call control process (a base station manager) in accordance with the internal process.

In addition, a designated protocol is performed through an interaction between processors. Since the processors which are distributed and are formed in a hierarchical structure perform a corresponding operation in accordance with the internal process, when the load of a specific processor is increased, such a load affects other processors and the entire system. As a result, the service of the system may be interrupted thereby.

The communication system which is formed with the distribution processors such as a switch and the like includes a control method for limiting the call in accordance with the entire or overload level by judging as to whether the number of call services which is needed in the CPU occupying ratio of the processor, the service waiting queue of the processor, and the processor exceeds a specific threshold value.

The above-mentioned method is described in the U.S. Pat. NO. 4,974,256 entitled "Load balancing and overload in a distributed processing telecommunication system."

This U.S. patent is directed to a mobile switch which is formed with processes for a judgement such as an overload, a control and a release. The reference value of a load which is used for an overload control is directed to using the CPU occupying ratio. The judgement, control and release algorithm are as follows.

The judgement of the overload is judged when the average occupying ratio of the processor exceeds a reference value.

The control of the overload is directed to the call recognition of the next region, and the recognition ratio is a load stabilization factor for controlling the level of the proportional relationship by the difference between the CPU reference value and the CPU occupying value and the level of the load.

The release of the overload is executed when the occupying ratio is below the reference value, and the recognition ratio is over 1.

In the method of judging the overload, since the conventional method which has the CPU as an object is directed to judging the overload state using the CPU occupying ratio of the current CPU, so it is difficult to check the variation trend with respect to a sharply increasing load and overload.

In addition, since the method of using the waiting queue of the processor and the number of the services have to secure a threshold value which is directed to judging the overload through a perfect experiment application, so that the above-mentioned method is not be adapted during a short period.

SUMMARY OF THE INVENTION

Accordingly, it is an object of the present invention to provide an improved overload control method using a call control process load ratio of a CDMA mobile system which overcomes the problems encountered in the conventional overload control method of a CDMA mobile system.

It is another object of the present invention to provide an overload control method using a call control process load ratio of a CDMA mobile system which is capable of controlling a paging and a signal transmission by a threshold value and an overload by a receiving signal by computing an average load ratio of a process and a variable permission ratio at the time of overload using the current CPU occupying ratio and a load ratio of a call control process.

To achieve the above objects, there is provided an overload control method using a call control process load ratio of a CDMA mobile system, which includes the steps of a first step for judging as to whether an overload is loaded by calling an overload judgement procedure when a timer of an overload control process is driven in accordance with a generation of a periodical process of an operating system; a second step for controlling an overload by calling the overload control procedure when it is judged as an overload as a result of the first step; and a third step for releasing the overload state by calling an overload release procedure when the previous state is an overload state by checking the previous state when it is judged that it is not an overload state as a result of the call in the first step.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The overload control method using a call control process load ratio of a CDMA mobile system according to the present invention will now be explained with reference to FIGS. 1 through 14.

Figure 1:
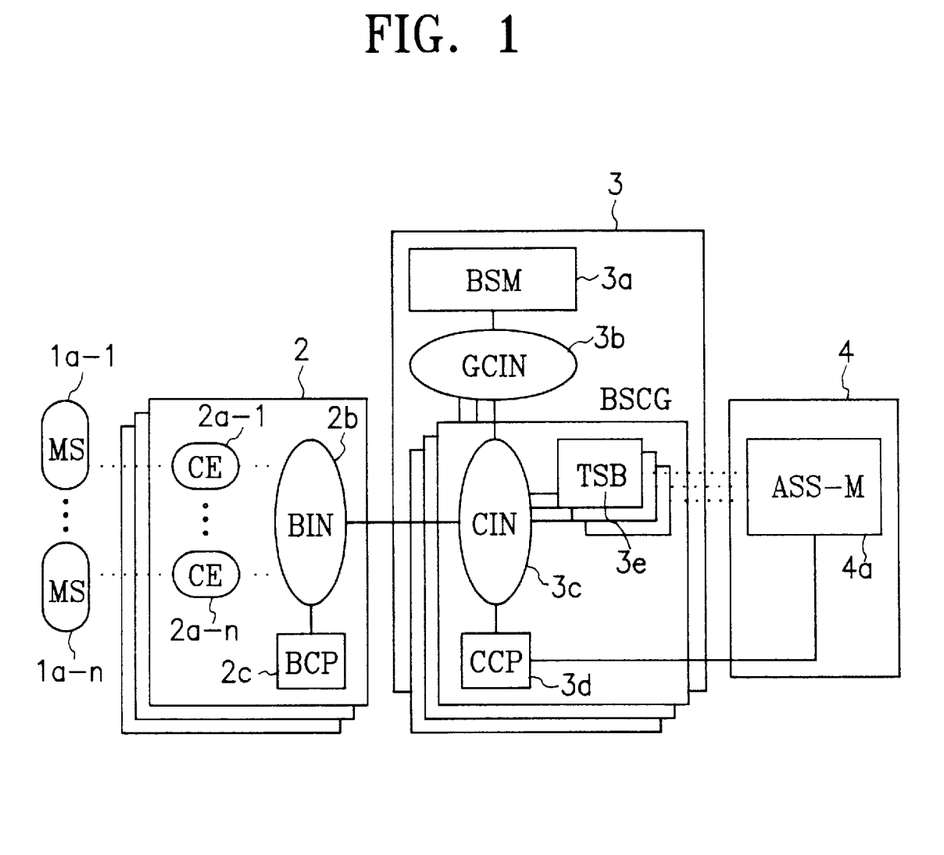
FIG. 1 is a view showing the construction of a CMS according to the present invention.

FIG. 1 is the construction of a CMS system which is adapted to the present invention, which includes a mobile station (MS) 1a-1 through 1a-n, a base transceiver subsystem (BTS) 2, a base station controller (BSC) 3, and a mobile exchange (MX).

The operation and effects of the present invention will now be explained with reference to the construction of the CMS.

First, a base station manager 3b of the base station controller 3 serves to perform the operation and maintenance of the base transceiver subsystem 2 and the base station controller 3, and the base station controller 3 controls a call control such as a soft handoff, and a wire or wireless link control and performs the operation and maintenance with respect to the base station controller 3 and the base transceiver subsystem 2.

There is a CDMA interconnection network (CIN) 3c of the base station controller 3, with the CIN 3c forming a path for transferring a packet data between the base station manager 3a and a station.

The base station controller 3 is formed with a call control processor (CCP) 3d for performing a call control and maintenance, and a transcoding selector band (TSB) 3e for coding an audio transcoding.

The controller of the TSB 3e is formed with an SIP and an SVP.

One base station controller can receive thirty two stations and thirty two SIPs in maximum, with each of the SIPs being formed with four SVPs in maximum.

The processors of the base station controller 3 has a multi-hierarchical structure.

The base transceiver subsystem 2 is connected to a BTS interconnection network (BIN) 2b through the base station controller 3 and a relay line E1, and can transmit or receive a control information through the CCP3d, and performs a routing and data receiving and transmitting with respect to the traffic information of a mobile exchange.

The above-mentioned processes are performed by a BTS control processor 2c which is a control processor of the base transceiver subsystem 2.

Figure 2:
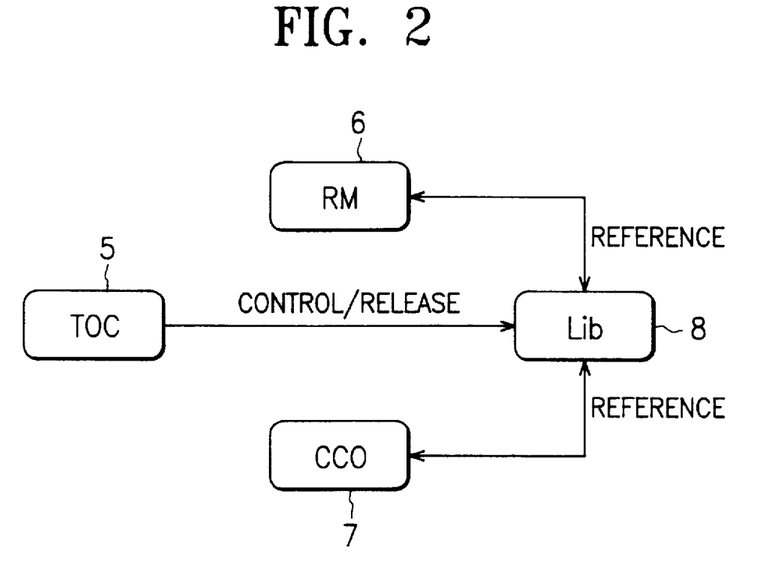
FIG. 2 is a view showing the features between software blocks according to the present invention.

FIG. 2 shows the construction of a software function. according to the present invention.

As shown therein, there are provided a traffic overload controller (TOC) 5 for judging the overload, controlling and releasing the overload, a resource manager (RM) 6 for receiving an MMC command word, a CCP call controller (CCO) 7 for controlling the call during the overload, and a common library 8, which is called by the overload controller 5 when controlling and releasing the overload, for providing the resource manager 6 and a common library 8.

Figure 3:
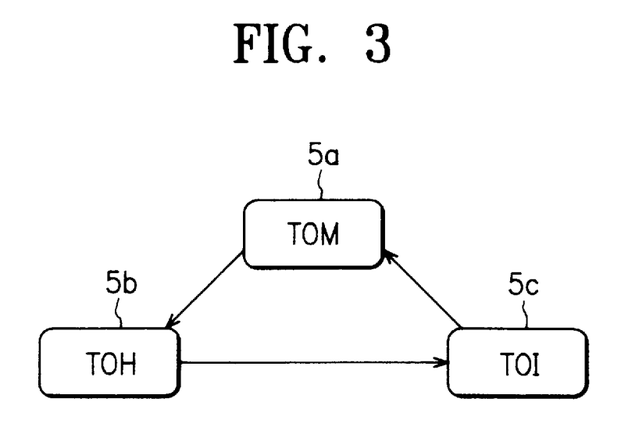
FIG. 3 is a view showing the construction of an overload control process according to the present invention.

FIG. 3 is the internal construction between the overload control processor which forming the traffic overload controller 5 as shown in FIG. 2, which includes a traffic overload manager (TOM) 5a for managing the entire traffic such as a match with an operating system, an overload judgement, and a release, an overload control handler (TOH) 5b for judging and controlling the occurrence of an overload, and a traffic overload interface (TOI) 5c for performing the match with the call control library at the time when controlling the overload.

Figure 4:
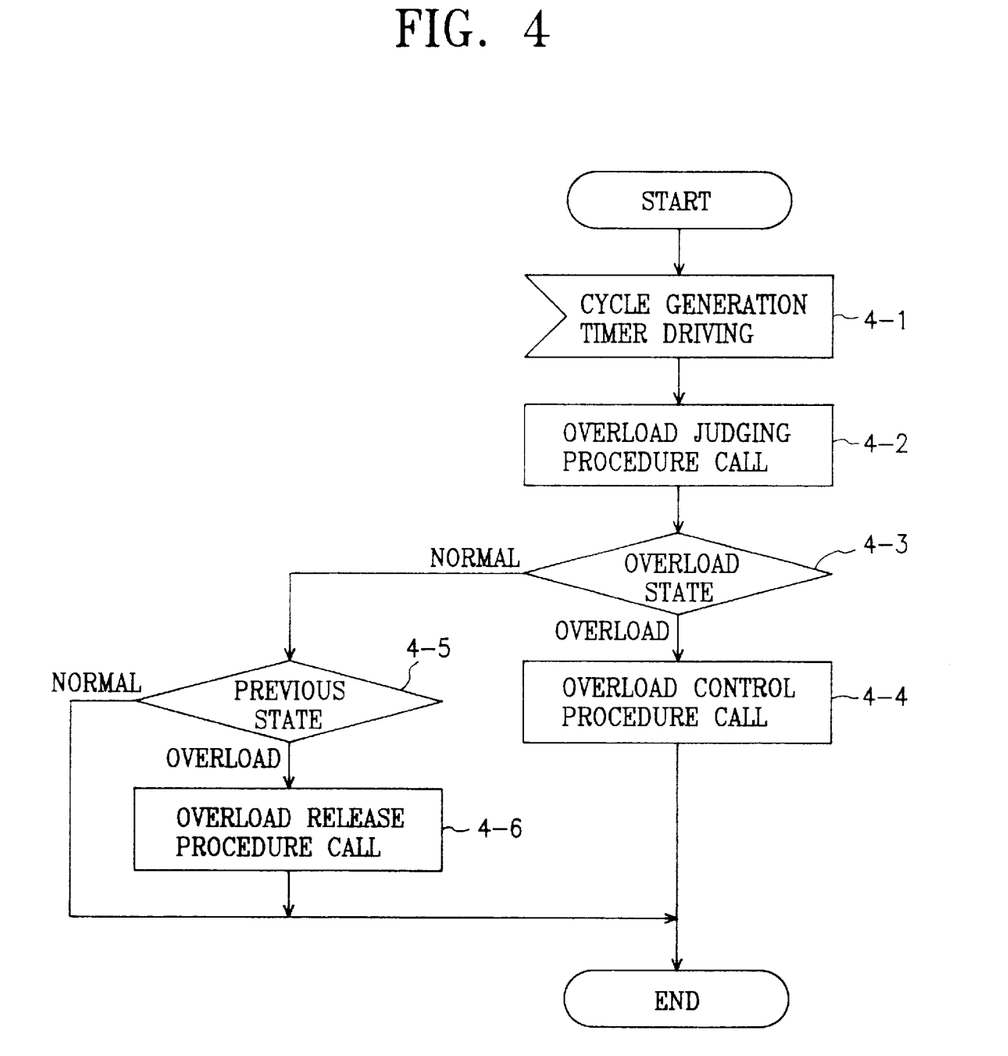
FIG. 4 is a flow chart of the entire function process of an overload control according to the present invention.

FIG. 4 shows the flow chart showing the entire control process of the overload control feature, which is formed of a judgement, a control, and a release.

When a timer is driven (4-1) of the overload control processor in accordance with a generation of a periodical process of the operating system, an overload judgement procedure is called (4-2).

As a result of the call, if it is judged as an overload (4-3), the overload control procedure is called (4—4) and is finished.

As a result of the call, if it is judged as a non-overload, the overload release procedure is called (4-6 ) and is finished.

Figure 5:
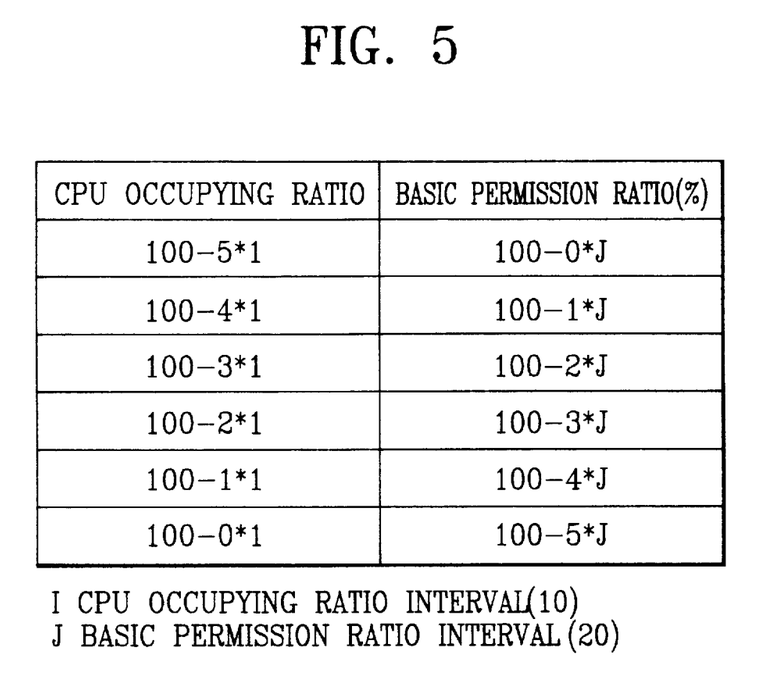
FIG. 5 is a table showing a basic permission ratio according to the present invention.

FIG. 5 shows the table of the basic permissible ratio, which shows the CPU occupying ratio (5-1), and a basic permission ratio (5-2 ) corresponding thereto.

The CPU occupying ratio is formed with six grades from the upper limit range to the lower limit range, with the interval therebetween being constant.

In addition, the basic permission ratio is ranged from 100 to 0 which corresponds top the minimum value of the CPU occupying ratio.

This table shows the computation of the average load ratio and the increasing level which are extracted using the CPU and the process load ratio when judging the overload, and the position corresponding thereto from the basic permission ratio table is computed, and the result is used for the permission and restriction of the call control.

Figure 6:
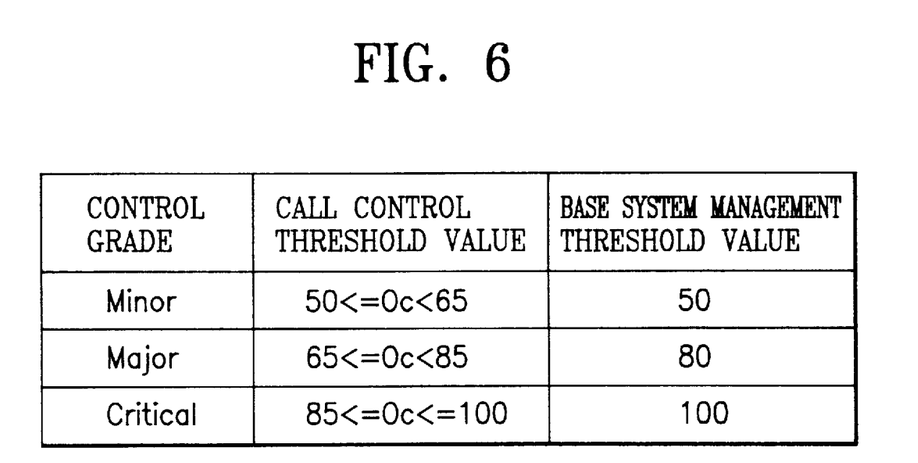
FIG. 6 is a table showing a call control process and base system management threshold value according to the present invention.

FIG. 6 shows the control threshold value table of the call control process and the base system management software.

The control level is formed with three categories such as minor, major, and critical (6-1), of which each call is formed with a call control process threshold value (6-2), and the base system management threshold value (6-3). The threshold value with respect to the call control software has the lower and upper limit values, and is computed into a sub-class which corresponds to the range of the value of the average load ratio Oc, thus indicating the level of the load.

In addition, the threshold value of the base system management has the same upper limit value as the lower limit value, and the process of the operator command is limited.

Figure 7:
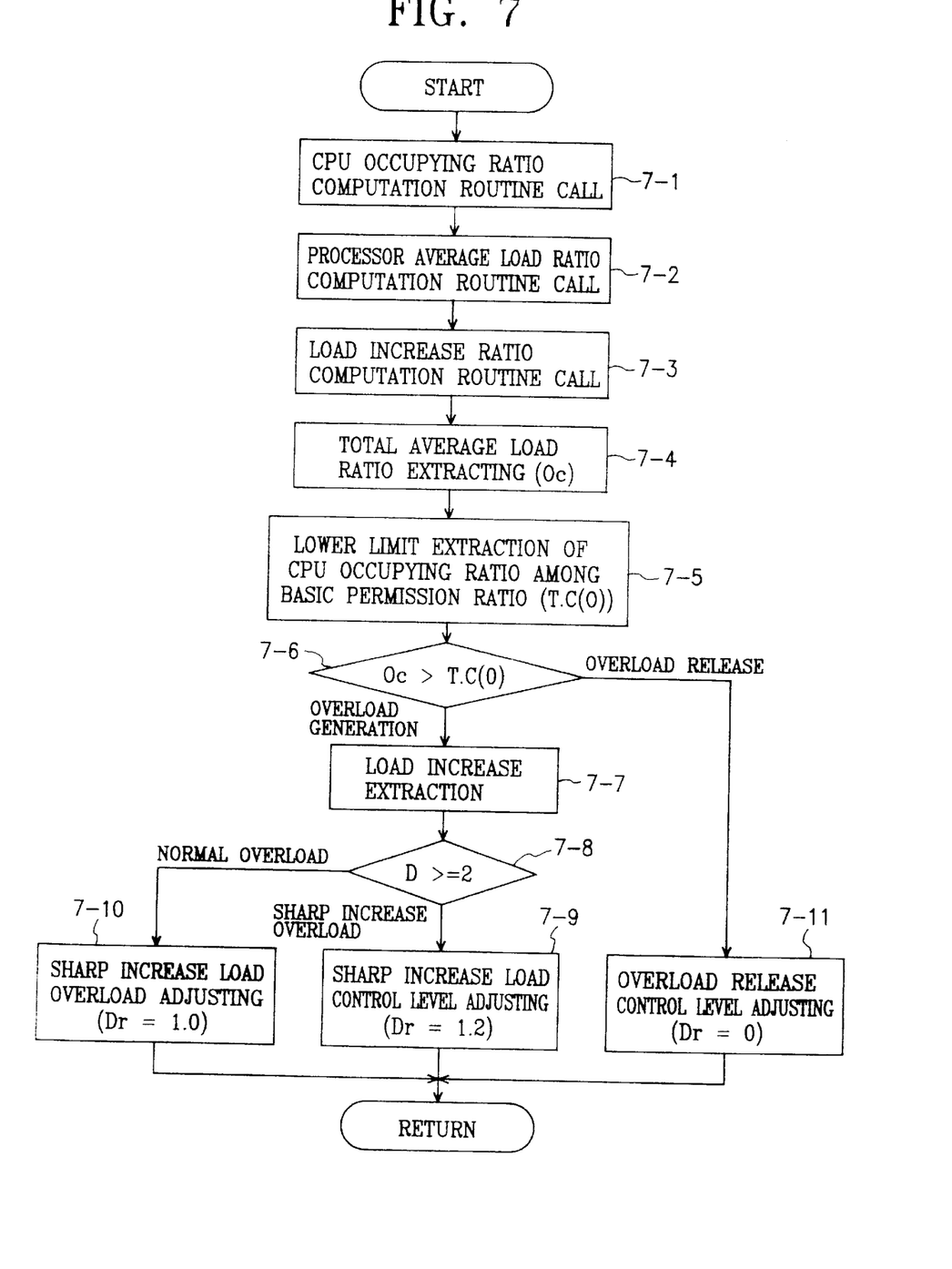
FIG. 7 is a flow chart of the overload judgement process according to the present invention.

FIG. 7 shows the flow chart of the overload judgment process, which is driven in accordance with a call of the overload judgement procedure of FIG. 4.

A CPU occupying ratio computation routine is called (7-1) in order to compute the occupying ratio of the CPU, and a computation routine (7-3) is called in order to compute the average load of the processor.

The current average load ratio is extracted (7-4), and the lower limit value of the CPU occupying level among the basic permission table is extracted (7-5).

The average load ratio and the lower limit value of the CPU occupying ratio are compared (7-6), and as a result thereof, if the average load ratio is lower than the lower ratio, it is judged as an overload, this extracting the load increasing level (7—7).

As a result, if the load increasing ratio is greater than 2 (7-8), the sharp increase overload control ratio (Dr) is adjusted to 1.2 (7-9), and the process is fedback to the call routine.

If it is lower than the load increase level, the sharp increase load control ratio is adjusted to 1.0 (7-10), and the process is returned to the call routine.

In addition, when the average load ratio is lower than or equal to the lower level of the CPU occupying ratio, the overload release control ratio is adjusted to 0 (7-11), and is judged that the overload is released, and the process is returned to the call routine.

Figure 8:
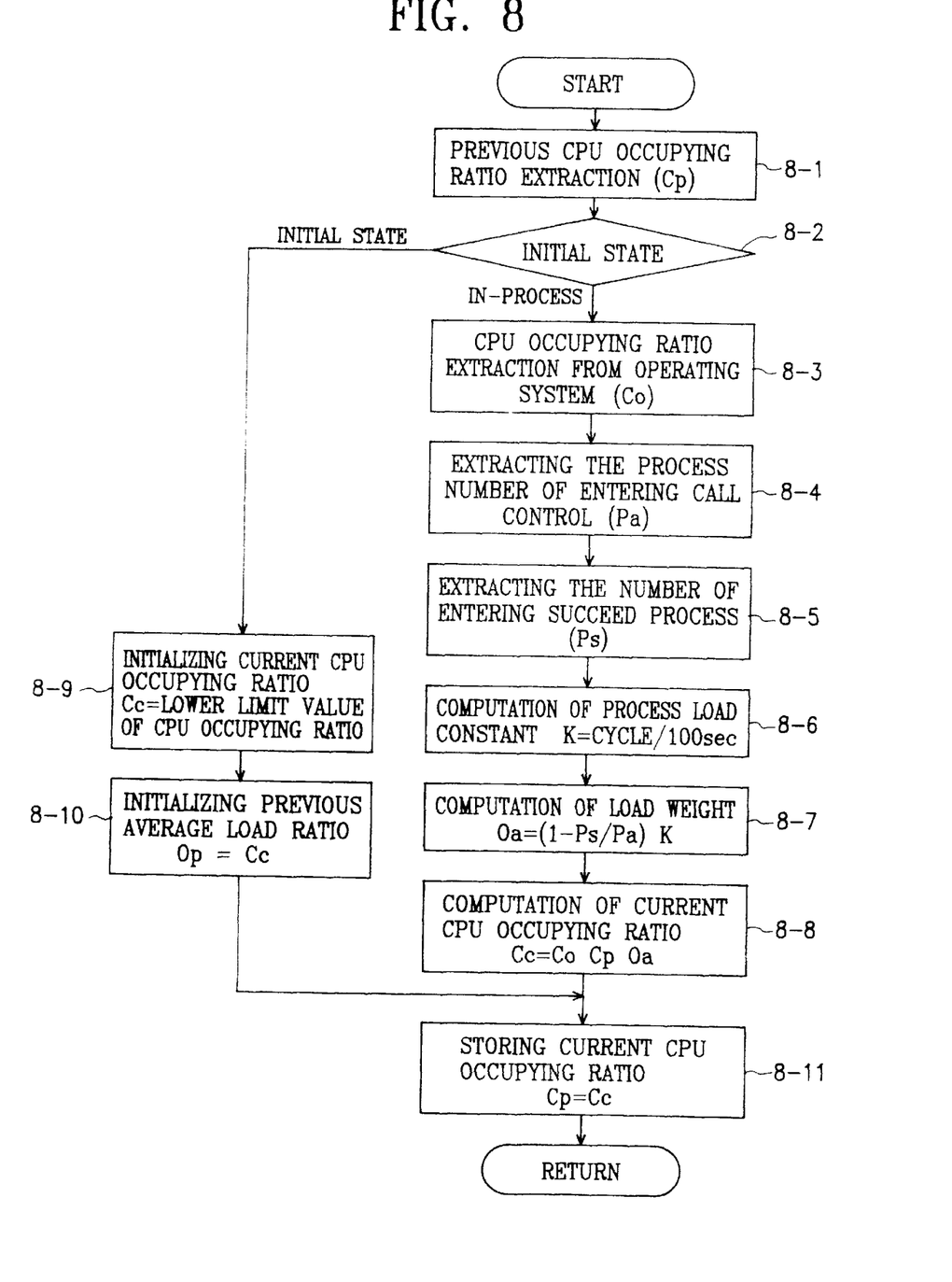
FIG. 8 is a flow chart of the computation process of a central processing unit(CPU) occupying ratio according to the present invention.

FIG. 8 is the flow chart of the CPU occupying ratio computation routine. The above-mentioned process starts in accordance with a call of the CPU occupying ratio computation procedure.

The previous CPU occupying ratio Cp is extracted and is stored (8-1).

After the initial state is checked (8-2), the initial state is in process, the current CPU occupying ratio Co is extracted from the operating system (8-3).

The number Pa of processes which are entered for the call control process is stored (8-4).

In addition, the number of the entered processes (the number of the entered processes − the number of the failed processes; Ps) is stored (8-5).

The process load constant K is computed using a judgement cycle/100 sec (8-6).

The load weight Oa is computed by an expression of (1Ps/Pa)*K (8-7).

The currently varied CPU occupying ratio Cc is extracted using the parameter Co*Cp*Oa (8—8).

The Cc is stored as Cp (8-11), and the process is returned to the call routine.

When the process state is checked as the initial state, the converted CPU occupying ratio (Cc=the lower level of the CPU occupying ratio of the table of the basic permission ratio) and the previous average load ratio Op are initialized (8-10), and the Cc is stored as Cp (8-11), and the process is returned to the call routine.

Figure 9:
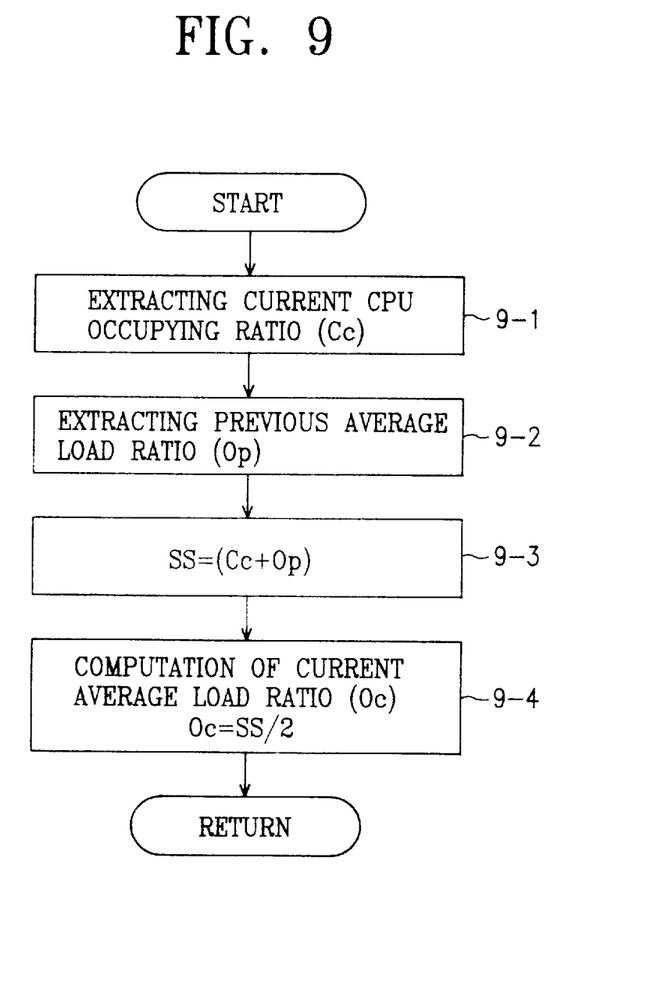
FIG. 9 is a flow chart of the computation of a mean load ratio of a processor according to the present invention.

FIG. 9 is a routine flow chart showing the computation of the average load ratio of the processor which is driven in accordance with a call of the average load ratio computation. procedure of the processor of FIG. 7.

The current CPU occupying ratio Cc is extracted (9-1), and the previous average load ratio Op is extracted (9-2), and two ratios are added and stored (9-3).

The above added result is divided by two, thus computing the current average load ratio Oc (9-4).

In addition, the process is returned to the call routine.

Figure 10:
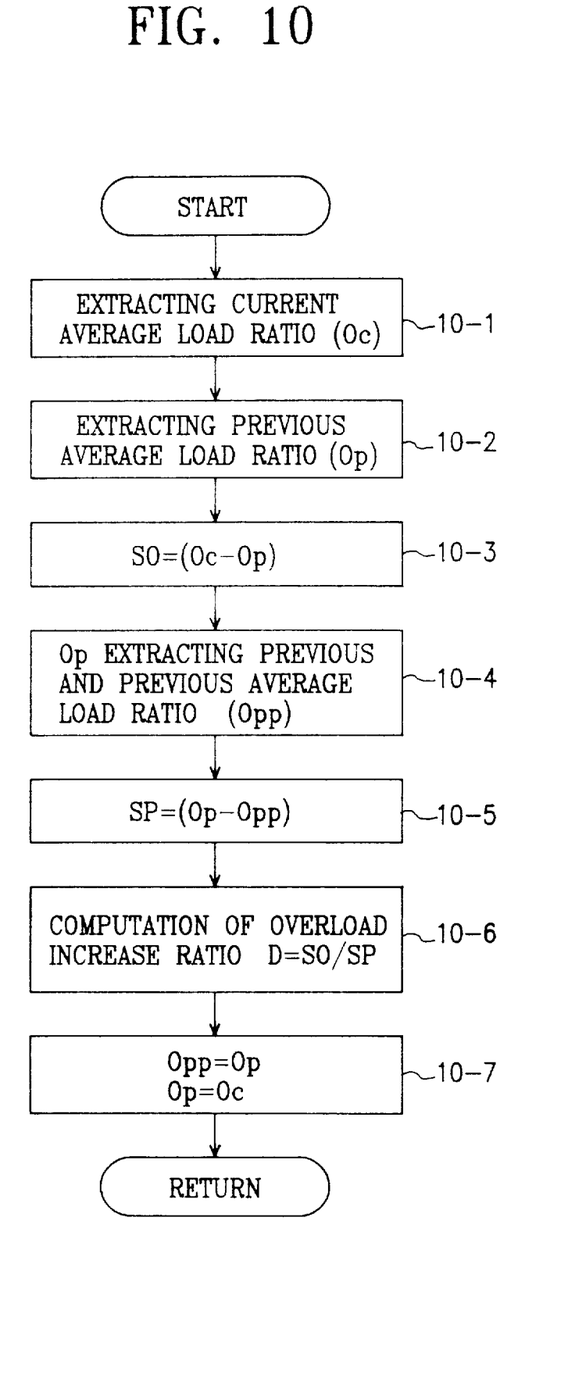
FIG. 10 is a flow chart of the computation of an increasing ratio with respect to an average load ratio according to the present invention.

FIG. 10 shows the flow chart of the routine of the computation of the increase ratio with respect to the average load ratio, which is driven in accordance with a call of the basic routine of FIG. 7.

The current average load ratio Oc is extracted and stored (10-1), and the previous average load ratio Op is extracted and stored (10-2).

The value which is obtained by subtracting the previous average load ratio from the current average load ratio (Oc−Op) is stored as So (10-3).

In addition, a value Opp which is a previous value of the value Op is extracted and stored (10-4), and the value which is obtained by subtracting the previous average load ratio of the value Op from the previous average load ratio is adjusted to the value Sp (10-5).

The thusly obtained value SO is divided by the value Sp, thus obtaining a slope value, and the overload increase D is obtained (10-6).

Lastly, the value Op is stored in the value Opp for using it during the next judgement cycle, and the value Oc is stored in the value Op, and the process is returned to the call routine.

Figure 11:
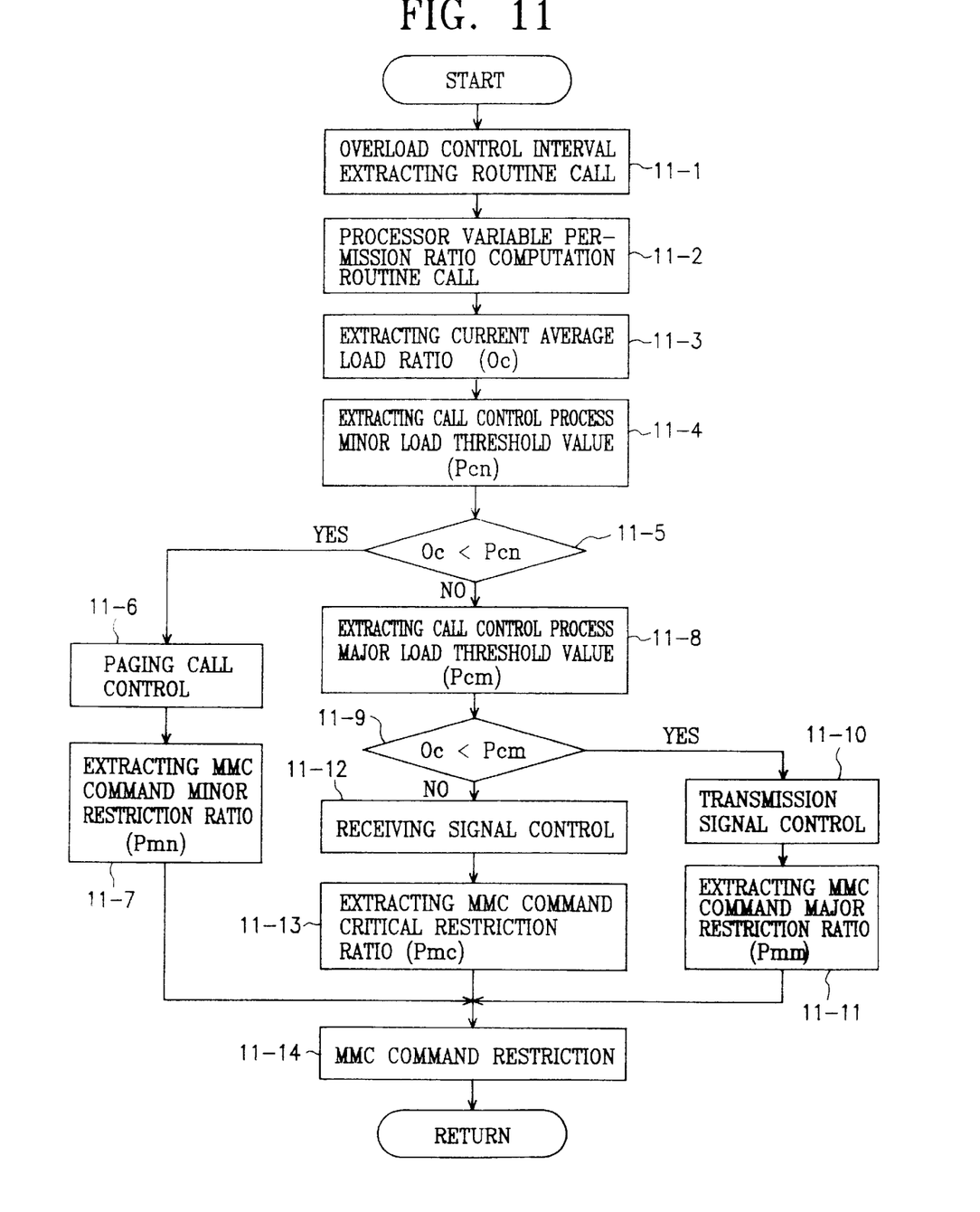
FIG. 11 is a flow chart of the control process when an overload is applied to the system according to the present; invention.

FIG. 11 is an overload control process flow chart, which is driven in accordance with a call of the overload control procedure as shown in FIG. 4.

A routine for extracting the overload control interval is called (11-1), and a computation routine for computing the processor variable permission ratio is called (11-2).

The current average load ratio Oc is extracted (11-3), and a minor load threshold value Pcn of the call control process is called (11-4).

If the average load ratio is smaller than the minor load threshold value (11-5), since it is referred to the minor state, a paging call is controlled using the library (11-6).

The MMC command is restricted as much as the restriction ratio by extracting a minor restriction ratio Pmn of an MMC command.

If the average load ratio is greater than the minor threshold value, a load threshold value Pcm of the call control process is extracted (11-8).

If the average load ratio is smaller than the major value (11-9), since it is a major state, the call transmission is controlled using the library (11-10).

The major restriction ratio Pmm of the MMC command is extracted (11—11), and the MMC command is restricted as much as the restriction ratio.

If the average load ratio is greater than the major threshold value, since it is a critical state, the call receiving is controlled using the library (11-12).

The critical restriction ratio Pmc of the MMC command is extracted (11-13), and the MMC command is restricted as much as the restriction ratio (11-14).

Figure 12:
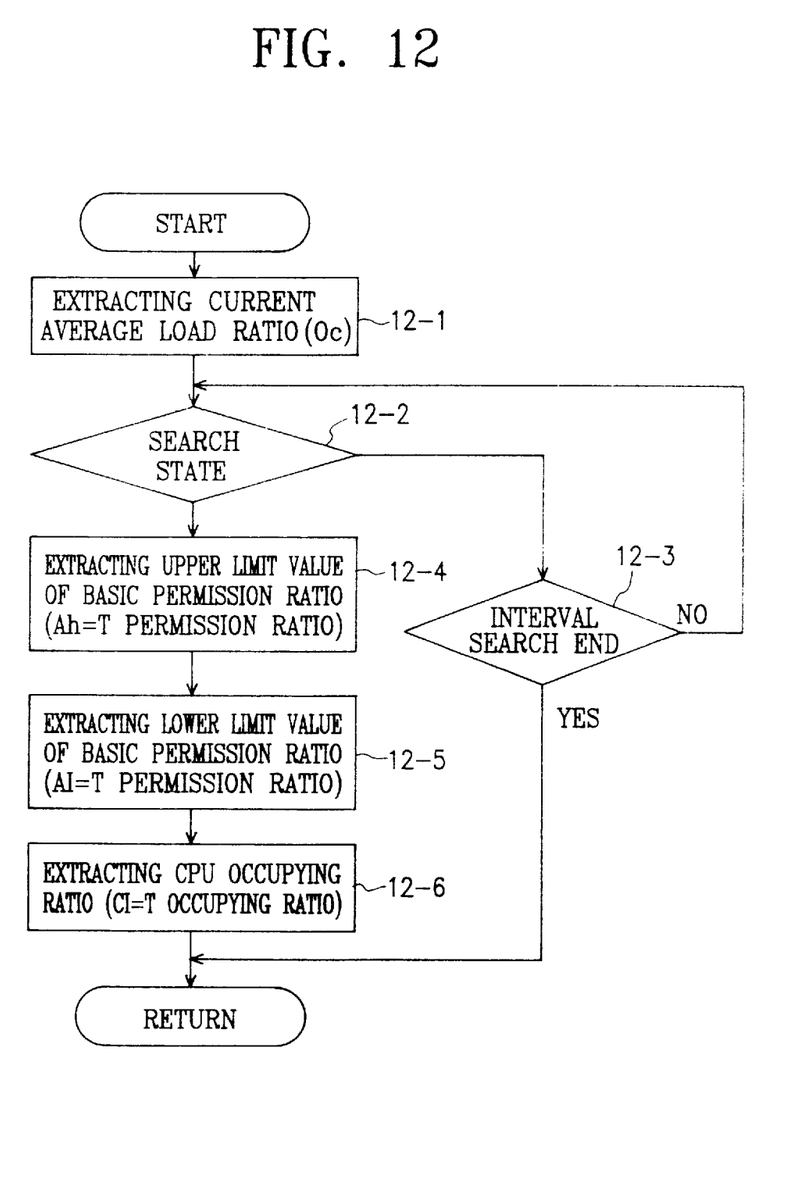
FIG. 12 is a flow chart of the overload control section extraction process according to the present invention.

FIG. 12 is a flow chart of a routine for extracting the overload control interval, which is driven in accordance with a call of the basic routine of FIG. 11.

The current average load ratio Oc is extracted, and stored (12-1), and an interval is detected from the basic permission ratio table (12-2).

When continuously detecting, it is judged that the interval search is finished (12-3), and if the interval search is not finished, the process is returned to the search process.

When the interval search is finished, the process is returned to the call routine.

When the search is finished, the upper limit value of the permission ratio is extracted from the basic permission ratio table and is stored Ah (12-4).

In addition, the lower limit value of the permission ratio is extracted and stored Al (12-5).

The CPU occupying ratio is extracted, and is stored (C1), and the process is returned to the call routine (12-6).

Figure 13:
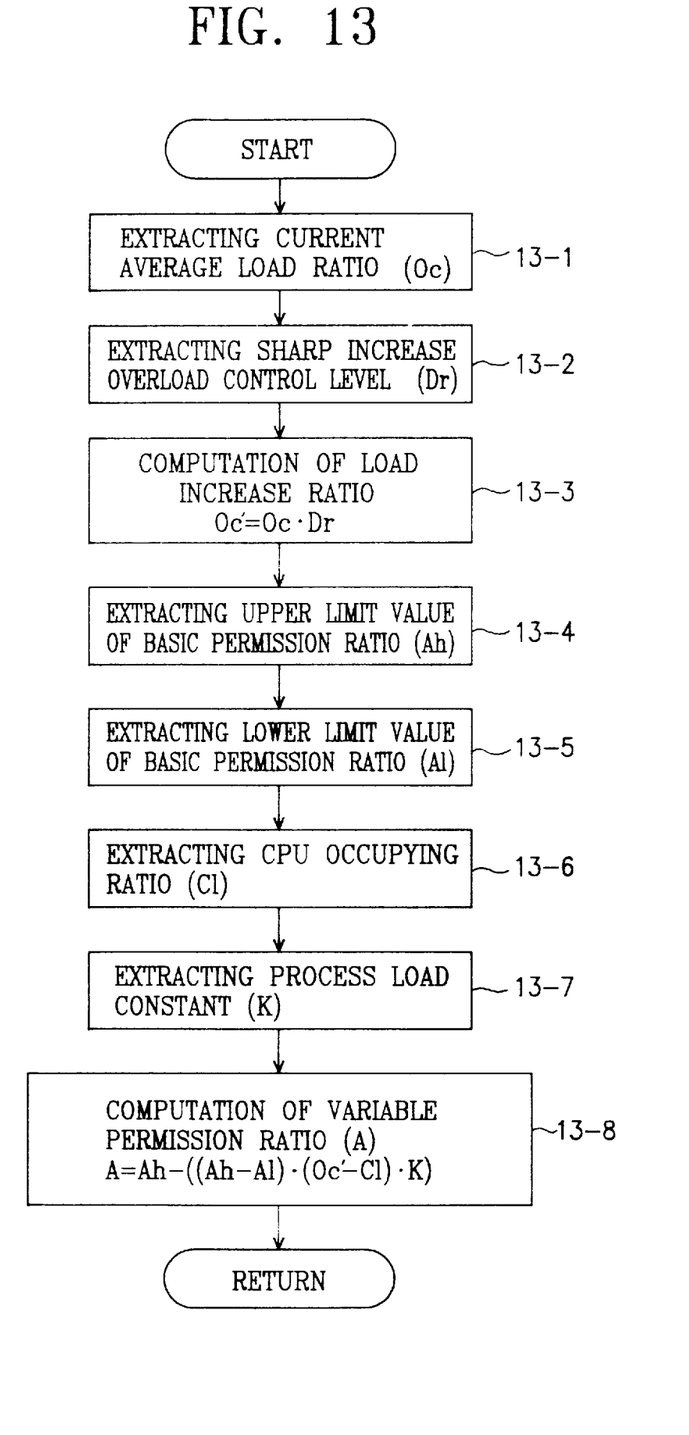
FIG. 13 is a flow chart of the computation of a process variable permission ratio according to the present invention.

FIG. 13 is a flow chart of a computation routine of a variable permission ratio of the call control process, which is driven in accordance with a call of the basic routine of FIG. 11.

The current average load ratio Oc is extracted (13-1), and the sharp increase overload control level Dr is extracted (13-2).

In addition, the above two values are multiplied (Oc*Dr), and a new load increase ratio Oc' is computed (13-3).

The upper limit value Ah of the basic permission ratio is extracted (13-4), and the lower limit value Al of the basic permission ratio is extracted (13-5), and the CPU occupying ratio C1 is extracted and stored (13-6).

Finally, the process load constant K is extracted (13-7), and the variable permission ratio "A=(Ah−(Ah-Al)*(Oc'-Cl)*k" is computed, and the process is returned to the call routine.

Figure 14:
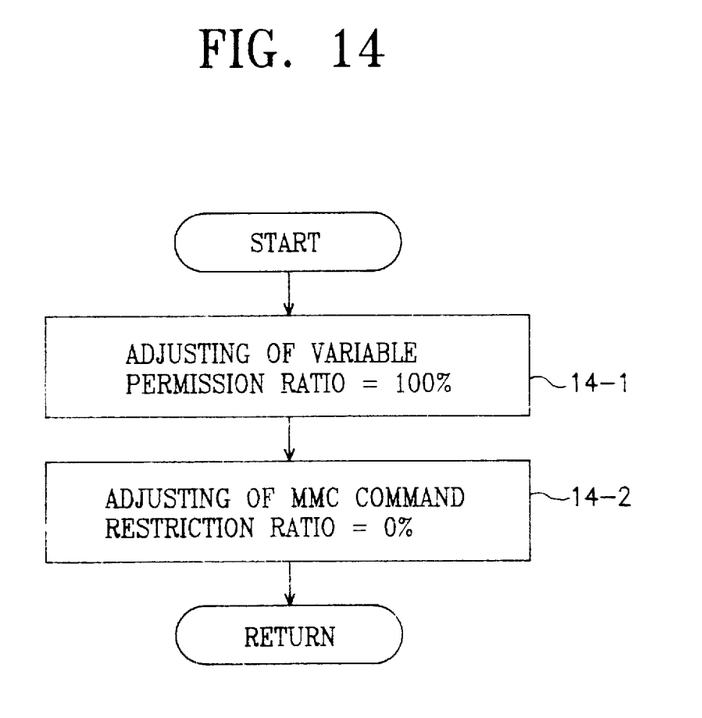
FIG. 14 is a flow chart of an overload releasing process according to the present invention.

FIG. 14 is a flow chart showing an overload release, which is driven in accordance with a call of the basic routine of FIG. 4.

The variable permission ratio is adjusted to 100% (14-1), and the restriction ratio of the MMC command is adjusted to a lower state of 0 (14-2), and the process is returned to the call routine.

As described above, the overload control method using a call control process load ratio of a CDMA mobile system according to the present invention is directed to using a state variation (the process load ratio) of the call control process and the CPU occupying ratio in accordance with the overload judgement, computing a new CPU occupying ratio, computing the average load ratio using the previous CPU occupying ratio, and judging the overload based on the above judgement, thus preventing an overload state which occurs due to the load increase of other feature which is not a feature of a call control process.

In addition, it is possible to judge the overload of the processor which is caused due to the traffic increase of the call control process. A sudden load increase can be effectively prevented by storing the previous CPU occupying ratio and the average load ratio, and it is possible to more effectively cope with a sharp increase of the overload by using the slope in case of a sharply increasing overload due to a continuously increasing traffic and by increasing a sharp increase overload control ratio when the increase ratio (which is proportional to the current average load ratio and the previous average load ratio) is more than two times.

In addition, when the load is decreased, it is possible to cope with the continuous overload by gradually adapting the paging, call transmission, signal receiving, or the like, thus enabling a more reliable system and operation thereof, and thus the performance of the system is increased, and the reliability of the CDMA mobile communication system is improved.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. An overload control method using a call control process load ratio of a CDMA mobile system, comprising the steps of:

a first step for judging as to whether an overload is loaded by calling an overload judgment procedure when a timer of an overload control process is driven in accordance with a generation of a periodical process of an operating system;

a second step for controlling an overload by calling the overload control procedure when it is judged as an overload as a result of the first step; and a third step for releasing an overload state by calling an overload release procedure when a previous state is an overload state by checking the previous state when it is judged that the overload state is not a result of a call in the first step;

wherein the first step includes the sub-steps of:

a first sub-step for calling a CPU occupying ratio computation routine for computing an occupying ratio of a CPU;

second sub-step) for calling an average load ratio computation routine for computing a process average load ratio;

a third sub-step for calling a load increasing ratio computation routine for computing a load increasing ratio;

a fourth sub-step for extracting the current average load ratio and for extracting a lower limit value of the CPU occupying ratio from a basic permission ratio table;

a fifth sub-step for comparing the extracted average load ratio with the lower limit value of the CPU occupying ratio, judging as an overload state when the average load ratio is smaller than the lower limit value as a result of the comparison, and extracting the load increasing ratio;

a sixth sub-step for adjusting the sharp increase overload control ratio to 1.2 when the extracted load increasing ratio is greater than or equal to 2 and for returning to the call routine;

a seventh sub-step for adjusting the sharp increase load control ratio when the extracted load increase ratio is smaller than 2 to 1.0 and for returning to the call routine; and an eighth sub-step for judging as an overload release when the average load ratio is smaller than or equal to the lower limit value of the CPU occupying ratio in the fifth sub-step, adjusting the overload release control ratio to 0 , and returning to the call routine.

2. The method of claim 1, wherein said first sub-step further includes the sub-steps of:

a first sub-step for extracting and storing the previous CPU occupying ratio, checking the initial state, and extracting the current CPU occupying ratio from the operating system when the process in the initial state as a result of the check;

a second sub-step for extracting the number of processes entered for the call control process after extracting the current CPU occupying ratio;

a third sub-step for extracting and storing the number (the number of the entered processes− the number of the failed processes) of succeed processes from the number of the entered. processes;

a fourth sub-step for computing a process load constant using an expression of "the judging cycle/100 sec";

a fifth sub-step for computing a load weight using an expression of "(1-Ps/Pa)*K";

a sixth sub-step for extracting the current varied CPU occupying ratio using a parameter of "Co*Cp*Oa"

which is obtained in the first sub-step through the fifth sub-step, where Co denotes the current CPU occupying ratio, Cp denotes the previous CPU occupying ratio, and Oa denotes the load weight;

a seventh sub-step for storing the extracted varied CPU occupying ratio and for returning to the call routine; and an eighth sub-step for initializing the varied CPU occupying ratio (refereed to the lower limit value of the CPU occupying ratio from the basic permission ratio of the table) and the previous average load ratio when the process in the initial state and for storing it as the previous CPU occupying ratio, and returning to the call routine.

3. The method of claim 1, wherein said second sub-step includes the sub-steps of:

a first sub-step for extracting the current CPU occupying ratio and the previous average load ratio;

a second sub-step for adding the extracted current CPU occupying ratio and the average load ratio;

a third sub-step for dividing the thusly computed result by 2 and for computing the current average load ratio.

4. The method of claim 1, wherein said third sub-step includes the sub-steps of:

a first sub-step for extracting and storing the current average load ratio and the previous average load ratio;

a second sub-step for subtracting the previous average load ratio from the current average load ratio and for storing the subtracted result as So;

a third sub-step for extracting the previous average load ratio and the previous average load ratio;

a fourth sub-step for subtracting the average load ratio of the previous average load ratio from the previous average load ratio and for storing the subtracted result value as Sp;

a fifth sub-step for dividing the value So by the value Sp and for computing an overload increasing ratio; and a sixth sub-step for storing the previous average load ratio as the previous and previous average load ratio for the use of the next judgement cycle, storing the value Oc as the previous average load ratio, and returning to the call routine.

5. The method of claim 1, wherein said second step includes the sub-steps of:

a first sub-step for calling a routine for extracting an overload control interval;

a second sub-step for calling a computation routine for computing a processor variable permission ratio;

a third sub-step for extracting the current average load ratio and for extracting a load threshold value of a call control minor;

a fourth sub-step for comparing the average load ratio with the minor load threshold value;

a fifth sub-step for controlling a paging call using a library when the average load ratio is smaller than the minor threshold value as a result of the comparison since it is judged as a minor state;

a sixth sub-step for extracting an MMC command minor restriction ratio and for restricting the MMC command as much as the restriction ratio;

a seventh sub-step for extracting a major load threshold value of a call control process major load when the average load ratio is greater than the minor threshold value as a result of the comparison in the fourth sub-step;

an eighth sub-step for comparing the average load ratio with the major load threshold value and for controlling a call transmission using a library when the average load ratio is smaller than the major load threshold value since it is a major state as a result of the comparison;

a ninth sub-step for extracting the major restriction ratio of the MMC command and for restricting the MMC command as much as the restriction ratio;

a tenth sub-step for controlling a call receiving using a. library when the average load ratio is greater than the major threshold value since it is a critical state; and an eleventh sub-step for extracting the critical restriction ratio of the MMC command, restricting the MMC command as much as the restriction ratio, and returning to the call routine.

6. The method of claim 5, wherein said first sub-step includes the sub-steps of:

a first sub-step for extracting and storing the current average load ratio;

a second sub-step for searching a predetermined interval from the basic permission ratio table;

a third sub-step for checking as to whether the interval search is finished when continuing the interval search, returning to the search state when the interval search is not finished as a result of the checking, and returning to the call routine when the interval search is finished;

a fourth sub-step for extracting the upper limit value of the permission ratio and the lower limit value of the interval permission ratio from the basic permission ratio table when the interval search is finished; and a fifth sub-step for extracting the CPU occupying ratio and for returning to the call routine.

7. The method of claim 5, wherein said second sub-step includes the sub-steps of:

a first sub-step for extracting and storing the current average load ratio and the sharp increase overload control ratio;

a second sub-step for multiplying the above two values and for computing a new load increase ratio;

a third sub-step for extracting the upper limit value of the basic permission ratio and the lower limit value of the same and for extracting and storing the CPU occupying ratio; and a fourth sub-step for extracting the process load constant, computing the variable permission ratio, and returning to the call routine.

8. The method of claim 7, wherein said fourth sub-step is directed to computing a variable permission ratio in accordance with an expression of $(Ah-(Ah-Al)*(Oc'-Cl)*k)$, where Ah denotes the upper limit value of the basic permission ratio, Al denotes the lower limit value of the basic permission ratio, Oc' denotes the new load increase ratio, Cl denotes the CPU occupying ratio, and k denotes the load constant of the processor.

9. The method of claim 1, wherein said third step includes the sub-steps of:

a first sub-step for adjusting the variable permission ratio to 100%; and a second sub-step for adjusting the MMC command restriction ratio to 0%, returning to the normal state, and returning to the call routine.

* * * * *